US008747214B2

(12) United States Patent
Kaminkow

(10) Patent No.: US 8,747,214 B2
(45) **Date of Patent: *Jun. 10, 2014**

(54) GAMING DEVICE HAVING TRANSFORMABLE WILD SYMBOLS OR CARDS WITH WILD SIGNAL INDICATORS

(71) Applicant: IGT, Reno, NV (US)

(72) Inventor: Joseph E. Kaminkow, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,500

(22) Filed: Jan. 18, 2013

(65) Prior Publication Data

US 2013/0137504 A1 May 30, 2013

Related U.S. Application Data

(63) Continuation of application No. 12/171,138, filed on Jul. 10, 2008, now Pat. No. 8,408,987, which is a continuation of application No. 10/920,798, filed on Aug. 18, 2004, now Pat. No. 7,399,225, which is a continuation of application No. 09/957,305, filed on Sep. 20, 2001, now Pat. No. 6,780,109.

(51) Int. Cl.
*A63F 13/00* (2014.01)

(52) U.S. Cl.
USPC .......................... 463/20; 273/138.1; 273/139

(58) Field of Classification Search
CPC ...... G07F 17/32; G07F 17/34; G07F 17/3267
USPC .................................. 463/16, 20; 273/138.1
See application file for complete search history.

(56) References Cited

U.S. PATENT DOCUMENTS

| | | | |
|---|---|---|---|
| 5,308,065 | A | 5/1994 | Bridgeman et al. |
| 5,332,228 | A | 7/1994 | Schultz |
| 5,423,539 | A | 6/1995 | Nagao |
| 5,431,408 | A | 7/1995 | Adams |
| 5,449,173 | A | 9/1995 | Thomas et al. |
| 5,823,873 | A | 10/1998 | Moody |
| 5,980,384 | A | 11/1999 | Barrie |
| 6,059,658 | A | 5/2000 | Mangano et al. |
| 6,089,977 | A | 7/2000 | Bennett |
| 6,120,031 | A | 9/2000 | Adams |
| 6,159,095 | A | 12/2000 | Frohm et al. |
| 6,190,254 | B1 | 2/2001 | Bennett |
| 6,220,959 | B1 | 4/2001 | Holmes, Jr. et al. |
| 6,251,013 | B1 | 6/2001 | Bennett |
| 6,270,411 | B1 | 8/2001 | Gura et al. |
| 6,290,600 | B1 | 9/2001 | Glasson |
| 6,299,165 | B1 | 10/2001 | Nagano |
| 6,299,170 | B1 | 10/2001 | Yoseloff |
| 6,302,398 | B1 | 10/2001 | Vecchio |
| 6,311,976 | B1 | 11/2001 | Yoseloff et al. |

(Continued)

*Primary Examiner* — Damon Pierce
(74) *Attorney, Agent, or Firm* — Neal, Gerber & Eisenberg LLP

(57) ABSTRACT

A gaming device having a transformable wild symbol or card on a set of reels or a transformable wild card in a set of cards, wherein the transformable wild symbol or card provides a signal to a player through a wild indicator or a non-wild indicator. The wild indicator indicates that the transformable wild symbol or card is in a wild state. The non-wild indicator indicates that the transformable wild symbol or card is in a non-wild state. In a wild state, the transformable wild symbol or card acts as a wild symbol or card on a set of reels, or a wild card.

22 Claims, 13 Drawing Sheets

(56) References Cited

U.S. PATENT DOCUMENTS

| | | | |
|---|---|---|---|
| 6,322,078 | B1 | 11/2001 | Adams |
| 6,358,144 | B1 | 3/2002 | Kadlic et al. |
| 6,419,579 | B1 | 7/2002 | Bennett |
| 6,439,993 | B1 | 8/2002 | O'Halloran |
| 6,454,266 | B1 | 9/2002 | Breeding et al. |
| 6,494,454 | B2 | 12/2002 | Adams |
| 6,517,432 | B1 | 2/2003 | Jaffe |
| 6,589,114 | B2 | 7/2003 | Rose |
| 6,604,740 | B1 | 8/2003 | Singer et al. |
| 6,616,142 | B2 | 9/2003 | Adams |
| 6,780,109 | B2 | 8/2004 | Kaminkow |
| 6,805,349 | B2 | 10/2004 | Baerlocher et al. |
| 6,866,583 | B2 | 3/2005 | Glavich et al. |
| 6,921,335 | B2 | 7/2005 | Rodgers et al. |

GAMING DEVICE HAVING TRANSFORMABLE WILD SYMBOLS OR CARDS WITH WILD SIGNAL INDICATORS

PRIORITY CLAIM

This application is a continuation of, and claims priority to and the benefit of, U.S. patent application Ser. No. 12/171,138, filed on Jul. 10, 2008, which issued as U.S. Pat. No. 8,408,987 on Apr. 2, 2013, which is a continuation of, and claims priority to and the benefit of, U.S. patent application Ser. No. 10/920,798, filed on Aug. 18, 2004, which issued as U.S. Pat. No. 7,399,225 on Jul. 15, 2008, which is a continuation of, and claims priority to and the benefit of, U.S. patent application Ser. No. 09/957,305, filed on Sep. 20, 2001, which issued as U.S. Pat. No. 6,780,109 on Aug. 24, 2004, the entire contents of each of which are incorporated herein by reference.

BACKGROUND

Gaming devices are well known. Many known gaming devices provide wild symbols or wild cards. Wild symbols provide a player with an additional opportunity to obtain winning combinations. The use of wild symbols, wild cards or wild indicators in gaming devices provide additional excitement and entertainment for players.

In a slot machine having reels, a wild symbol can enable the matching of symbols along a payline to achieve a combination. For example, in a three reel slot machine, the symbols along a payline on the first, second and third reels may be, respectively, a heart, a heart and a wild symbol. If the gaming device awards a player for a three heart combination, the wild symbol substitutes for a heart and provides the player with that combination.

In a video poker game, a wild symbol substitutes for a card. For example, in a five card draw poker gaming machine where the gaming device displays five cards, the cards can be a 10, Jack, Queen, King and wild card. The wild card substitutes as an Ace and provides the player with a winning combination.

Wild cards have been employed in gaming devices in other manners. For example, U.S. Pat. No. 5,431,408 discloses a gaming device having a video poker gaming scheme. A player is dealt a hand consisting of five cards. The player is also given a wild card. The wild card is separate from the dealt hand. The player can reserve the wild card for use with a subsequent hand. Thus, the player can use the wild card in a hand in which it is most advantageous to do so.

In another example, U.S. Pat. No. 6,089,977 discloses a gaming device having a roaming wild symbol. More specifically, the patent discloses a gaming device having a plurality of virtual reels which have a set of symbols. Certain symbol combinations serve as triggering events. When one of these combinations occur on the reels, a wild card symbol appears on the reels in the form of a graphical image and moves along the reels. As the wild card symbol moves from one symbol or location to adjacent symbols or locations, the symbols sequentially transform into the wild card symbol. After each move of the wild card symbol, the gaming device determines and pays the player for any winning combinations which are the result of the transformation. When the wild card symbol moves to the next adjacent symbol, the symbol previously transformed reverts to its original state.

To increase player enjoyment and excitement, it is desirable to provide gaming devices having new and different wild symbol, wild indicator and wild card schemes.

SUMMARY

The present invention provides a gaming device having transformable wild symbols which selectively transform into wild symbols. A wild/non-wild signal is associated with the transformable wild symbol to indicate whether the transformable wild symbol is wild or not wild.

In one embodiment, the gaming device has a plurality of virtual reels. The reels include various symbols, such as hearts, numbers, cherries and other suitable symbols. The reels also include at least one transformable wild symbol which alternates between at least two states. The states are a wild state and a non-wild state. The wild/non-wild signal associated with the transformable wild symbol includes a wild indicator and a non-wild indicator. The wild indicator indicates when the transformable wild symbol is in a wild state. The non-wild indicator indicates when the transformable wild symbol is in a non-wad state.

In one embodiment, the transformable wild symbol is in the form of a traffic signal having a section displaying the word "RED" and a section displaying the word "GREEN." Lights corresponding to the words are also included in the sections. The "GREEN" section on the traffic signal is the wild indicator that indicates or informs the player that the transformable wild symbol is in a wild state. The "RED" section on the traffic signal is the non-wild indicator that indicates or informs the player that the transformable wild symbol is in a non-wild state. When the "GREEN" section is fit or otherwise highlighted or indicated, the transformable wild symbol is in the wild state. In the wild state, the transformable wild symbol may combine with symbols on the other reels to provide winning combinations in a conventional manner. When the "RED" section is it or otherwise highlighted or indicated, the transformable wild symbol is in the non-wild state.

It should be appreciated that the transformable wild symbol of the present invention is not limited to being a traffic signal, and can be any other symbol, indicia or indicator having a plurality of states. For example, the transformable wild symbol could be a die having six states, one for each face of the die, wherein some states are wild and some states are not wild. In another example, the transformable wild symbol is in the form of a coin which has two states represented by "HEADS" and "TAILS." The "HEADS" side is a wild indicator and the "TAILS" side is a non-wild indicator.

If the transformable wild symbol is in a wild state, the gaming device may further inform the player that the transformable wild symbol is in a wild state. In one embodiment, the gaming device displays the word "WILD." The gaming device can also emit an audio message from the speakers. Other audio or visual methods are also contemplated in accordance with the present invention.

In one embodiment of the present invention, the reels spin and stop in a conventional manner. If a transformable wild symbol appears on the reels, and in one embodiment, on a payline of the reels, the wild indicator and the non-wad indicator begin to alternate and eventually stop alternating to provide either a wild state or a non-wild state which is determined by the processor of the gaming device.

The processor preferably randomly determines if the symbol is in the wild or non-wild state. In one embodiment, each transformable wild symbol may have a probability that the transformable wild symbol will become wild which the processor uses to determine if the symbol will be wild or non-wild. Each transformable wild symbol in a game may also have a different associated probability. In the traffic signal example, the "RED" and "GREEN" sections or lights would alternatively flash. In one embodiment, the processor causes the "RED" and "GREEN" sections to randomly flash. In a further embodiment, the wild-indicator and the non-wild indicator are alternating when the reels stop, so that the player immediately sees the alternating wild and non-wild states. In a further embodiment, the reels do not stop at the same time. They stop sequentially or in any order or combination. If the first reel includes a transformable wild symbol and stops such that the transformable wild symbol is on a payline, the other reels continue spinning while the wild indicator and the non-wild indicator alternate. Simultaneously when the next reel stops, the game maintains and displays the wild indicator or the non-wild indicator which is displayed at the moment the second reel stops. This creates an exciting and interesting game for the player, in part because the transformable wild symbol is not necessarily wild and the player must await the determination.

It should also be appreciated that the transformable wild symbol could be employed in other games. For example, in one embodiment, the gaming device displays a set of cards for a video poker game. A transformable wild symbol or card may be displayed on one or more of the cards. The gaming device displays a wild/non-wild signal to the player to indicate if the transformable wild symbol or card is or is not in a wild state. If the transformable wild symbol or card is in a wild state, the card which includes the transformable wild symbol or card becomes a wild card.

It is therefore an advantage of the present invention to provide a gaming device having a transformable wild symbol.

Other objects, features and advantages of the invention will be apparent from the following detailed disclosure, taken in conjunction with the accompanying sheets of drawings, wherein like numerals refer to like parts, elements, components, steps and processes.

Additional features and advantages are described herein, and will be apparent from the following Detailed Description and the figures.

DETAILED DESCRIPTION

Gaming Device and Electronics

Figure 1A:
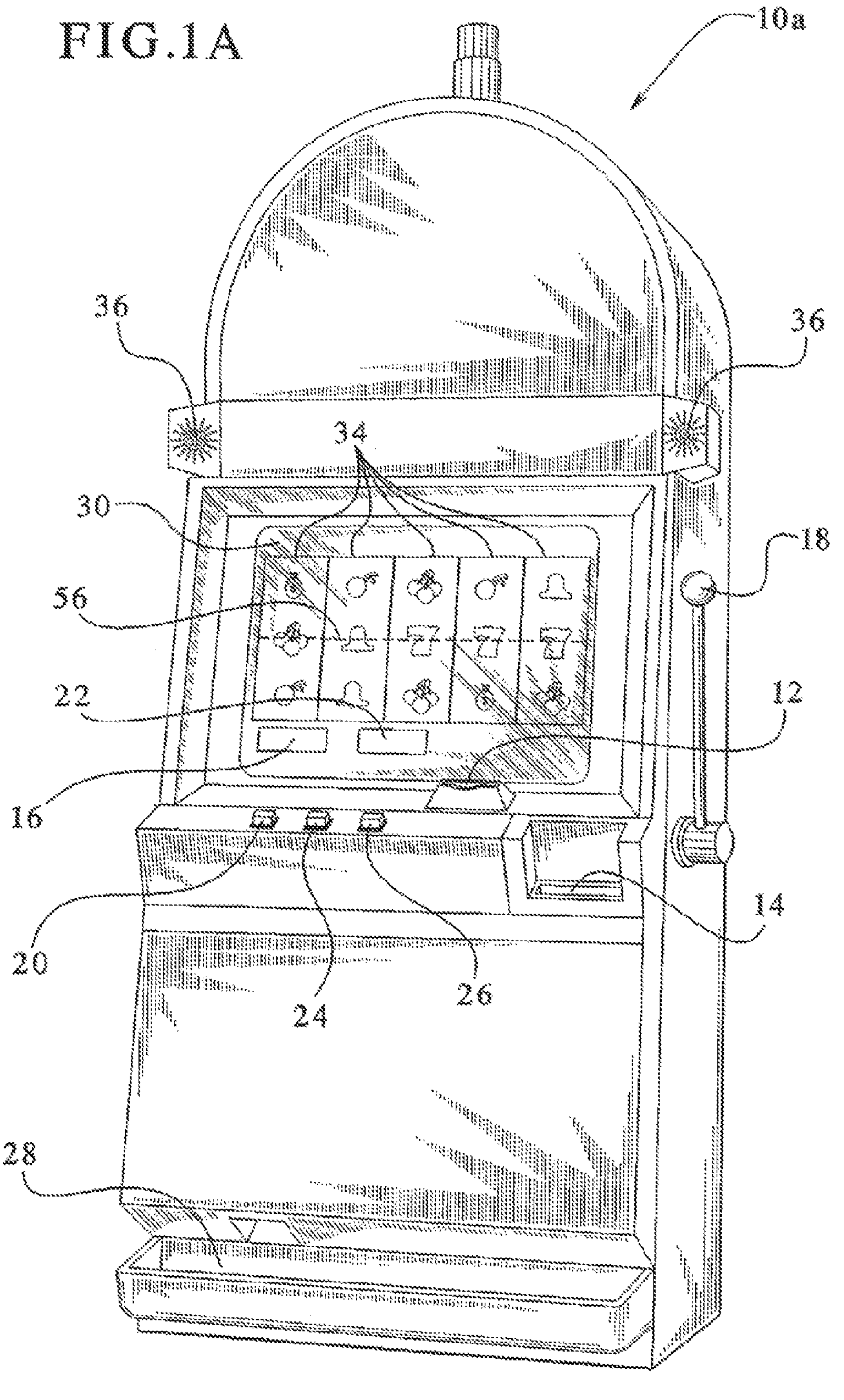
FIGS. 1A and 1B are perspective views of alternative embodiments of the gaming device of the present invention.
Figure 1B:
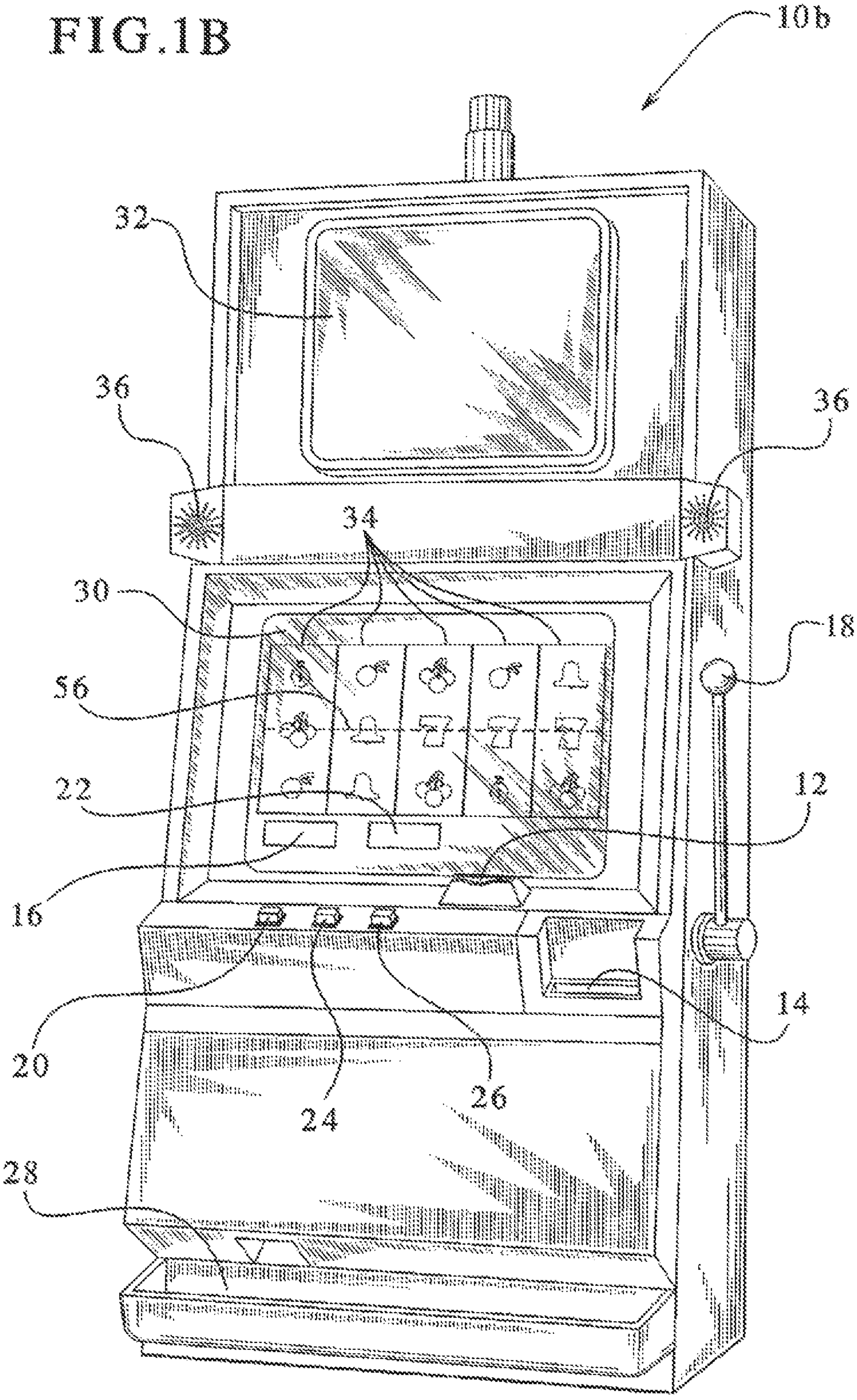

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the transformable wild symbol(s) being implemented in a game as described below being a stand alone game or a bonus or secondary game that coordinates with a base game. When the present invention is implemented in a bonus game, gaming device 10 in one base game can be a slot machine having the controls, displays and features of a conventional slot machine, or a video card game such as poker, blackjack, etc. The gaming device 10 may also include any bonus triggering events, bonus games as well as any progressive game coordinating with these base games. The player can operate the gaming device while standing or sitting. Gaming device 10 also includes being a pub-style or table-top game (not shown), which a player operates while sitting.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not shown) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reel 34 is preferably a video monitor. Each base game, especially in the slot machine base game of the gaming device 10, includes speakers 36 for making sounds or playing music.

Figure 2:
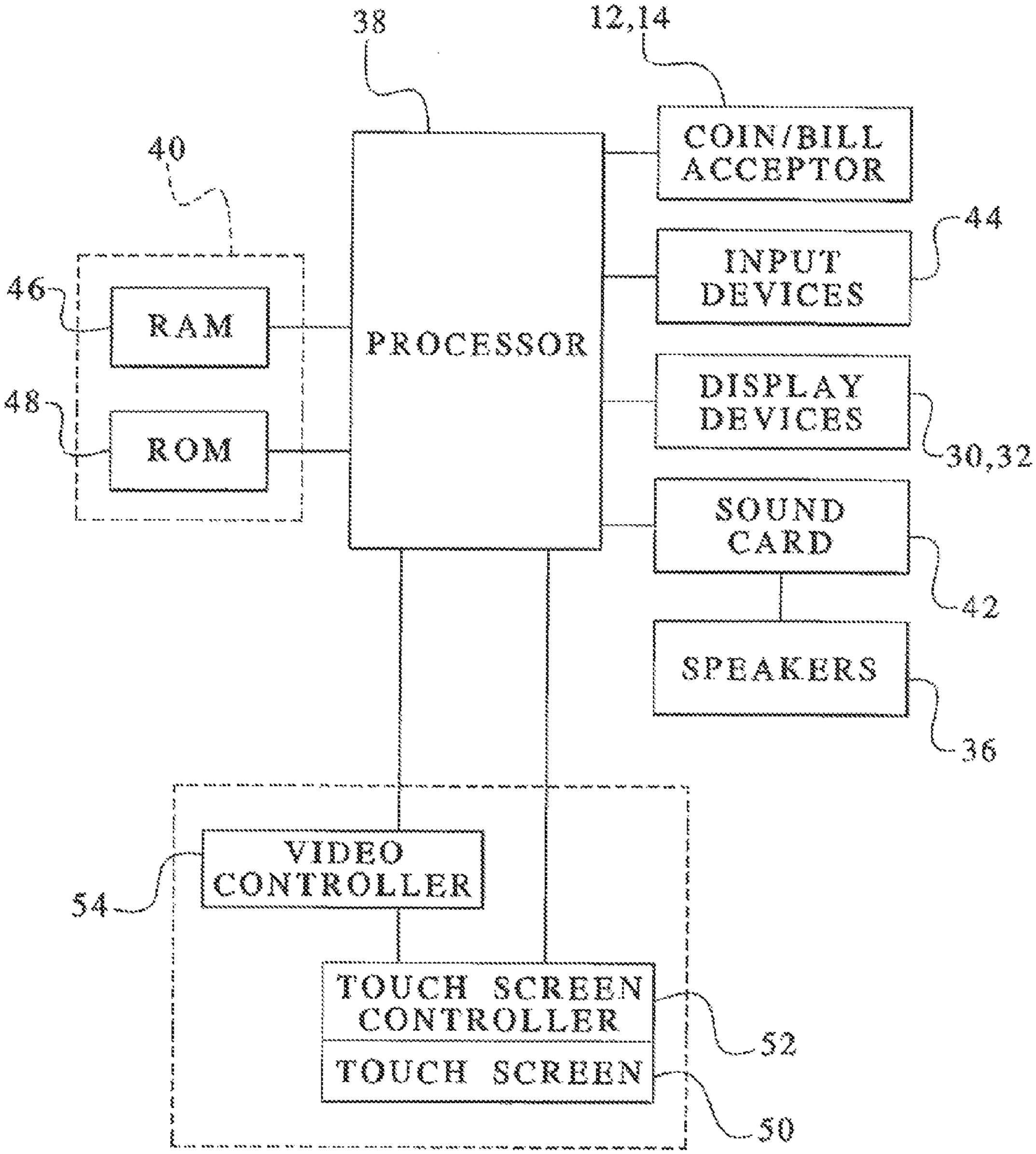
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, may include bonus games that give players the opportunity to win credits. The gaming device 10 may employ a video-based display device 30 or 32 for the bonus games. The bonus games include a program that automatically begins when the player achieves a qualifying condition in the base game.

In the slot machine embodiment, the qualifying condition for a bonus game includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof. In another embodiment, the qualifying condition includes a particular card combination in a video poker or blackjack game.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

Transformable Wild Symbols

Figure 3:
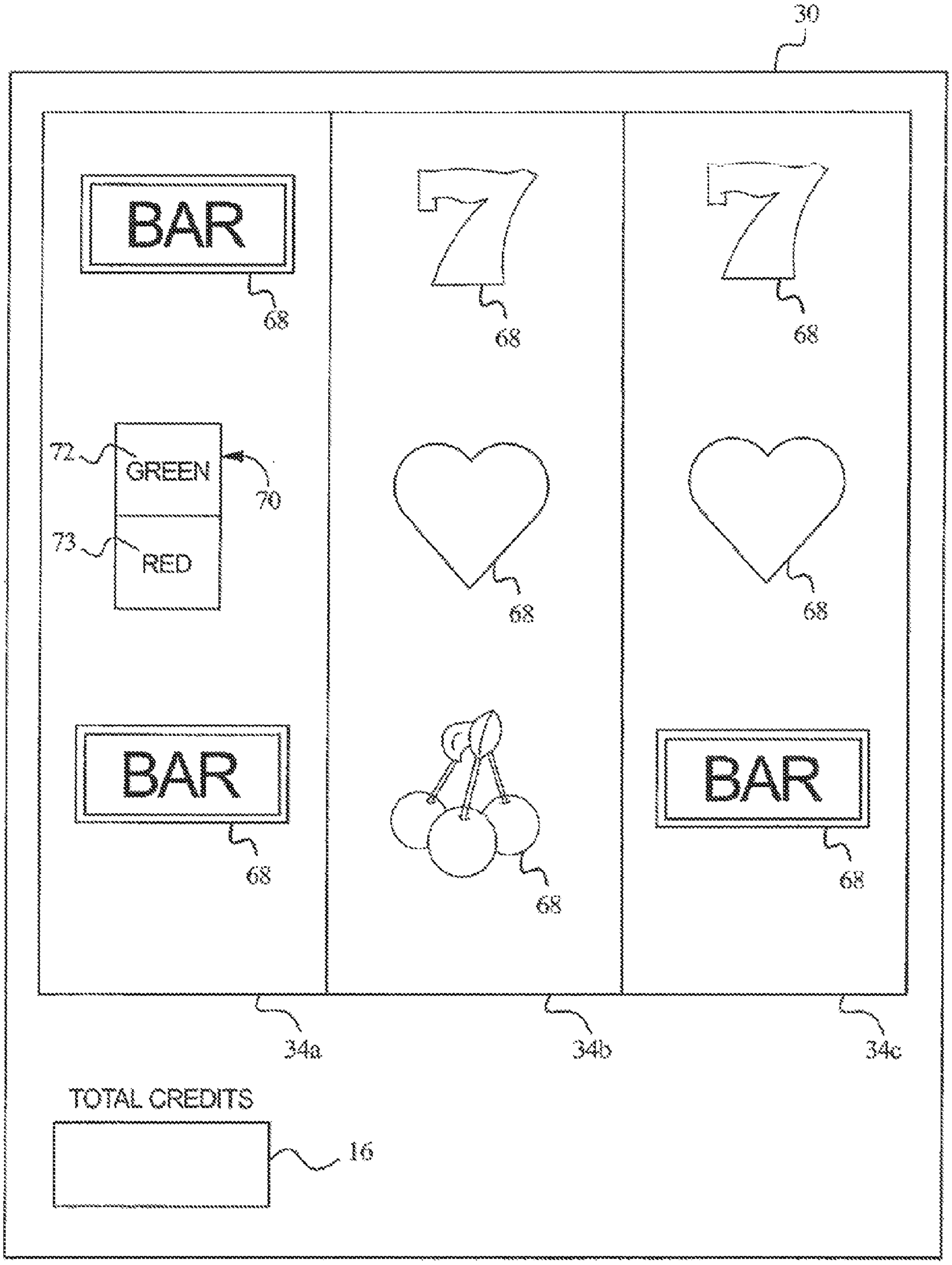
FIG. 3 is a front elevation view of a display device having a plurality of video reels and a transformable wild symbol on one of the reels.

In one embodiment, the gaming device has three virtual reels 34*a*, 34*b* and 34*c* displayed within the display device 30 as illustrated in FIG. 3. The reels have a set of symbols such as the displayed symbols 68. At least one reel contains a transformable wild symbol 70. It should be appreciated that one reel could contain more than one transformable wild symbol, that a plurality of reels could contain transformable wild symbols, and that all of the reels could have transformable wild symbols. It should further be appreciated that one or more non-transformable wild symbols could also be included on the reels in combination with one or more transformable wild symbols. The transformable wild symbol has a plurality of states. At least one of the states is a wild state and at least one of the states is a non-wild state. The transformable wild symbol also includes a wild/non-wild signal. The wild/non-wild signal includes a wild indicator 72 which indicates when the transformable wild symbol is in the wild state. The wild/non-wild signal also includes a non-wild indicator 73 which indicates when the transformable wild symbol is in the non-wild state.

In the illustrated embodiment, the transformable wild symbol 70 is in the form of a traffic signal having "GREEN" and "RED" displayed in different sections with each section having a light corresponding with the word displayed. The "GREEN" section 72 is the wild indicator. The "RED" section 73 is the non-wild indicator.

In one embodiment of the present invention, the reels spin and stop in a conventional manner. If a transformable wild symbol appears on a payline, as illustrated in FIG. 3, the processor causes the wild symbol indicator 72 and the non-wild indicator 73 to indicate the alternating between the wild and non-wild states to the player. In this embodiment, the processor causes the red and green lights or sections 72 and 73, respectively, to flash. The processor can randomly choose the wild state or the non-wild state for the transformable wild symbol 70. Eventually, the indicators stop alternating and the transformable wild symbol is in a wild or non-wild state.

In the above embodiment, the first reel includes a transformable wild symbol in the form of a traffic signal. When the reel stops spinning, the "RED" and "GREEN" indicators of the traffic light begin flashing in an alternating manner. Eventually, the "RED" and "GREEN" indicators stop flashing and either the "RED" indicator or "GREEN" indicator remains illuminated, indicating that the transformable wild symbol is in a wild state or a non-wild state.

In one embodiment, the processor predetermines upon the reel spin whether the transformable wild symbol will be in the wild state or in the non-wild state. Each transformable wild symbol can have an associated probability of being wild (or non-wild) which the processor uses to make the determination. Each wild symbol could have the same probability or could have a different probability. The probability of being wild may also be randomly determined by the processor or selected from a pool of probabilities.

Figure 4:
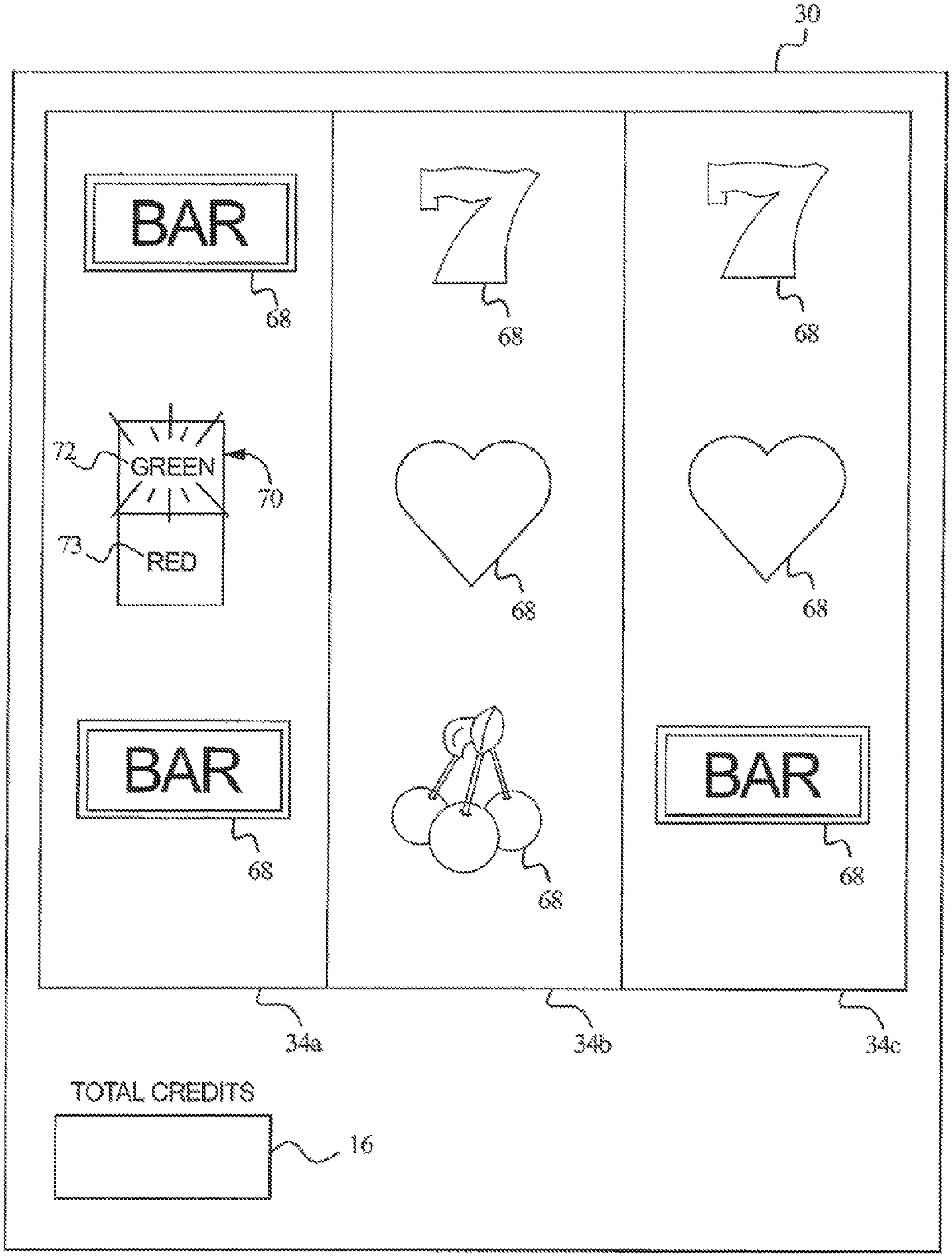
FIG. 4 is a front elevation view of a display device in which the transformable wild symbol displayed on the reel is alternated into a wild state.

In the illustrated example, the wild indicator 72 in the form of the "GREEN" light or section is shown illuminated in FIG. 4. The transformable wild symbol is in the wild state and the transformable wild symbol 70 acts as a wild symbol.

When the transformable wild symbol is in the wild state, it can substitute for any other symbol within the set of symbols used in the game. The processor awards the player credits for any winning combinations and the credit amount is displayed in a credit display 16.

Figure 5:
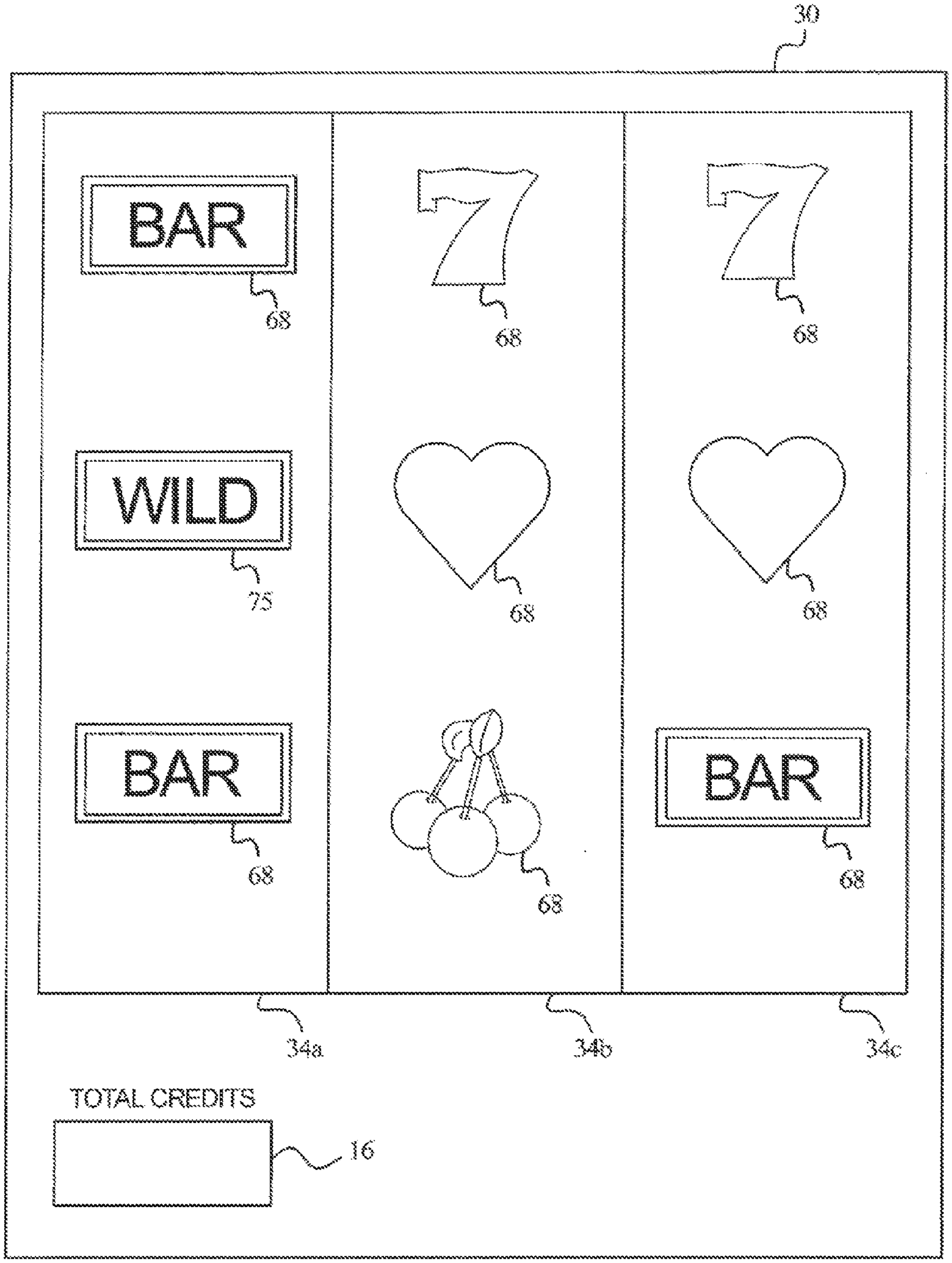
FIG. 5 is a front elevation view of a display device in which the transformable wild symbol alternated into the wild state is transformed into a wild symbol.

The processor may also inform the player that the transformable wild symbol is a wild symbol using audio messages, other visual displays, or a combination thereof. In one embodiment, the transformable wild symbol 70 changes into a symbol 75 including the word "WILD," as illustrated in FIG. 5.

It should be further appreciated that the gaming device of the present invention may alternatively include mechanical reels. The gaming device can display the transformable wild symbol in a wild or non-wild state by, for example, backlighting or any other suitable method. In an embodiment in which the transformable wild symbol is in the form of a traffic signal, the signal would include two lights which are illuminated by the processor.

Figure 6:
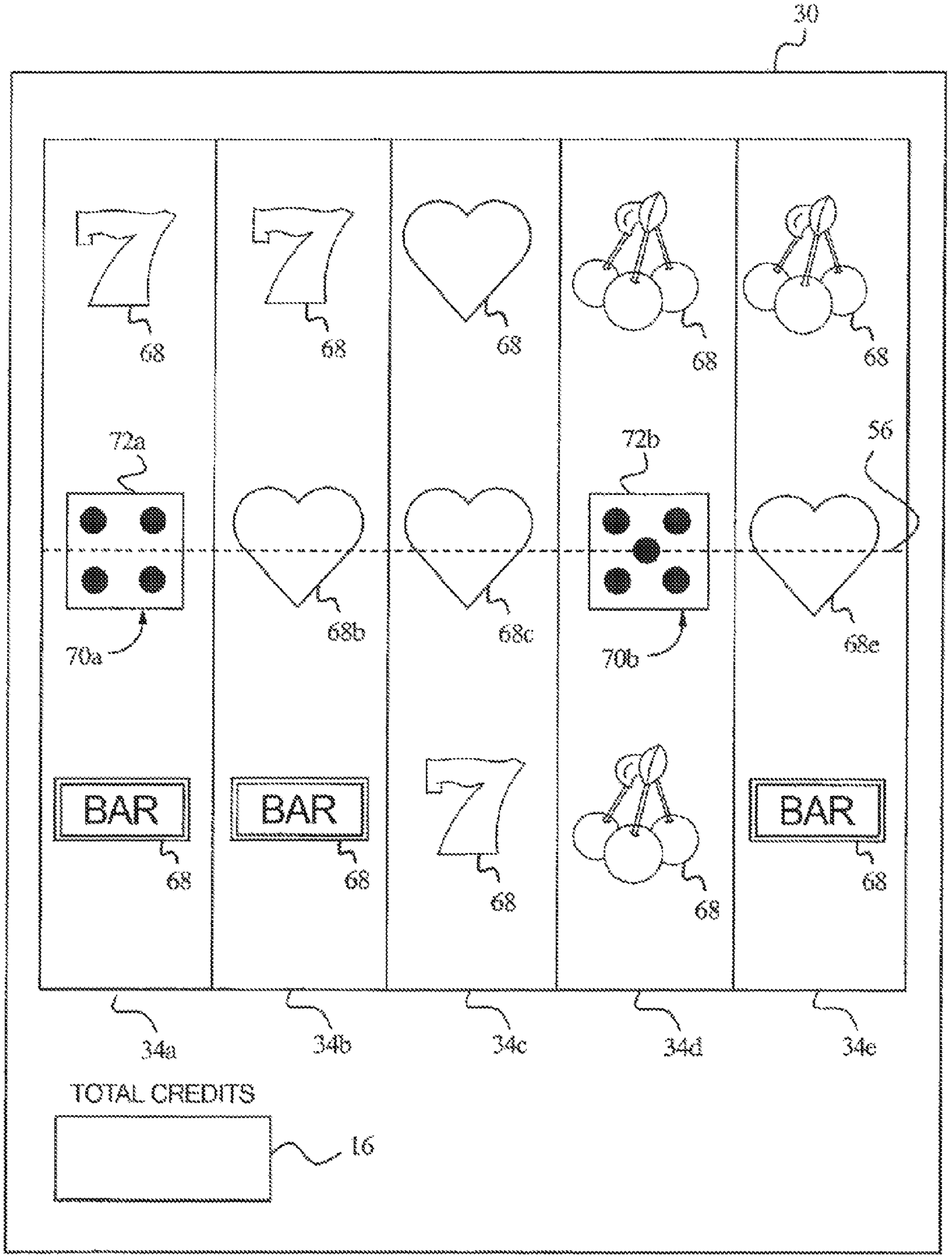
FIG. 6 is a front elevation view of a display device which includes dice type transformable wild symbols on a set of reels.

Referring now to FIG. 6, it should be appreciated that the wild/non-wild signal, which in certain embodiments includes both the wild indicator and the non-wild indicator, could be displayed in any other suitable manner to the player. In one example, the transformable wild symbol is in the form of a die, wherein each face on the die is a wild indicator or a non-wild indicator. If the die has faces displaying the numbers 1 through 6, the numbers 1 through 3 may be non-wild indicators and the numbers 4 through 6 may be wild indicators. Thus, the number of wild and non wild indicators is equal. In another embodiment, the number of wild and non-wild indicators could be unequal. The probability of the transformable wild symbol being wild could correspond to the relative number of wild or non-wild indicators or could be unrelated to the number of each wild or non-wild indicators.

In another embodiment, after the reels are spun, the first reel which includes at least one transformable wild symbol stops spinning before the other reels. If the first reel includes a transformable wild symbol along a payline, the indicators of the transformable wild symbol alternate as the other reels continue to spin. The player can see the indicators alternate as the other reels spin. This adds excitement and enjoyment to the game because the player knows the player has a chance at obtaining a wild symbol. When a second reel stops spinning, the transformable wild symbol may simultaneously stop alternating and display either the wild indicator or non-wild indicator. Alternatively, when the third reel or final reel stops, the appropriate indicator could indicate if the transformable wild symbol is in the wild or non-wild state.

In another embodiment, more than one reel includes a transformable wild symbol displayed within the display device. In this embodiment, the processor may transform more than one transformable wild symbol into a wild symbol. The transformations are performed simultaneously, successively, or in any combination thereof. The gaming device awards a player for winning combinations along any designated payline.

Figure 7:
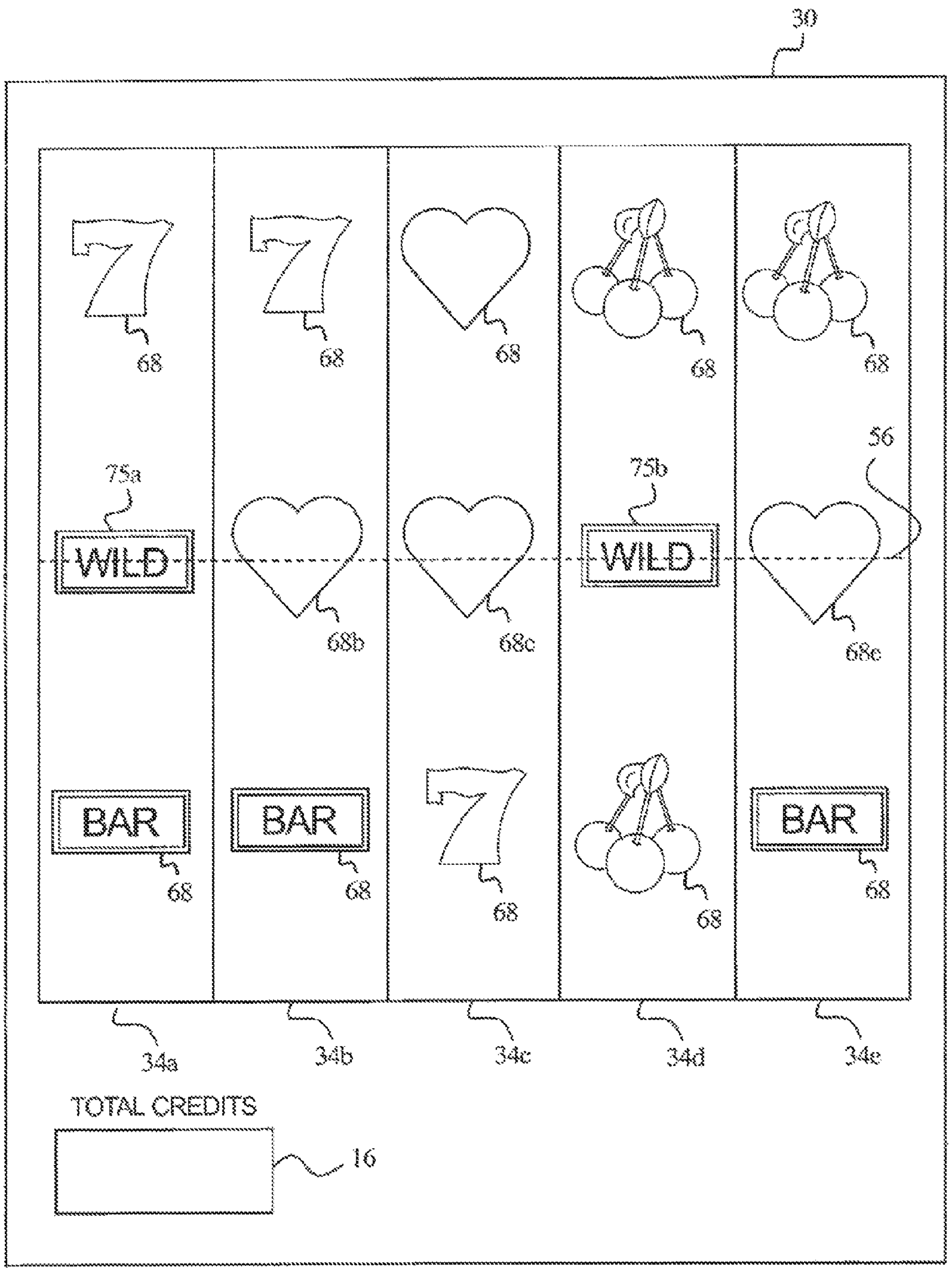
FIG. 7 is a front elevation view of a display device in which certain transformable wild symbols are alternated into a wild state and transformed into a wild symbol.
Figure 8A:
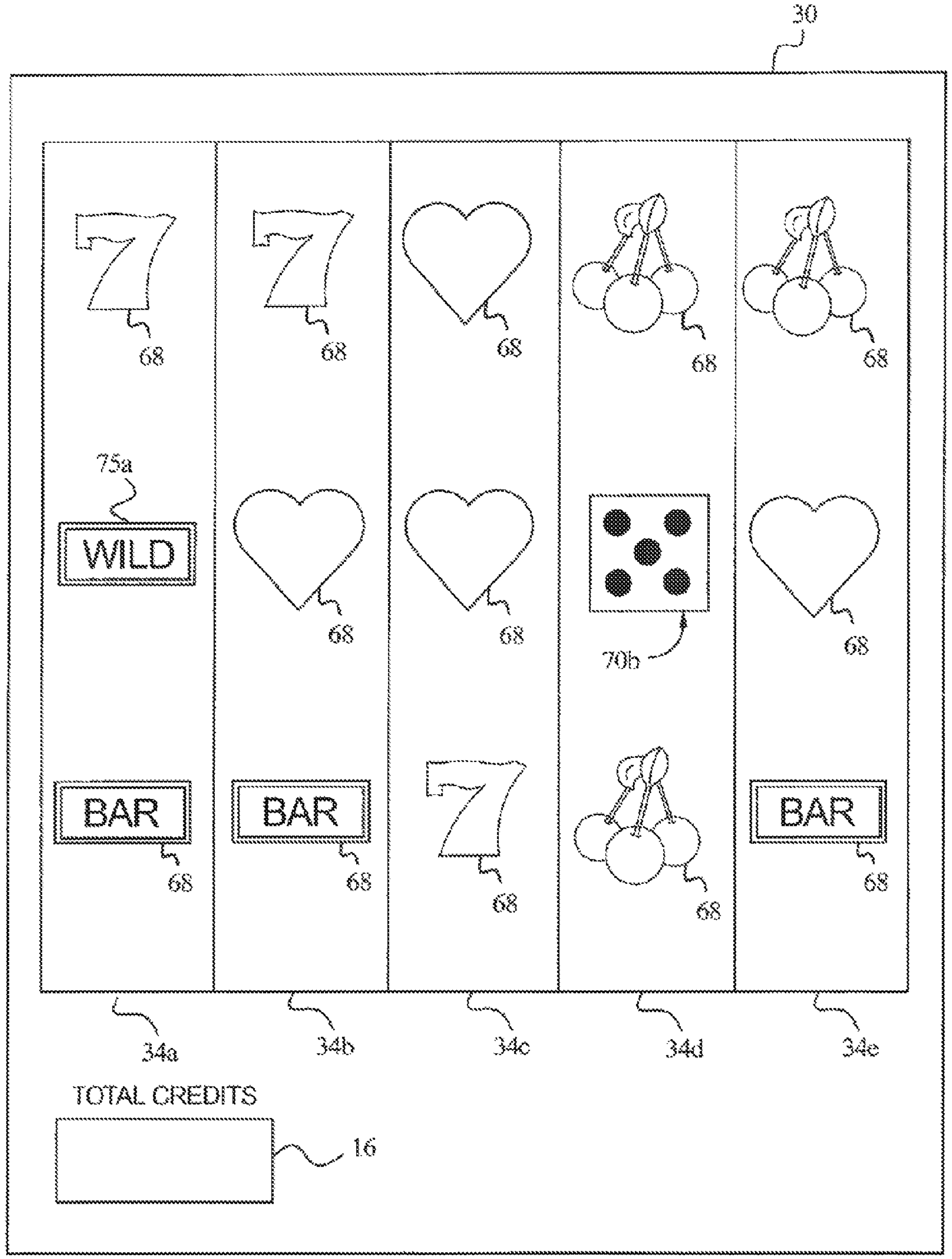
FIGS. 8A and 8B are front elevation views of a display device in which one transformable wild symbol is alternated and transformed into wild symbols.
Figure 8B:
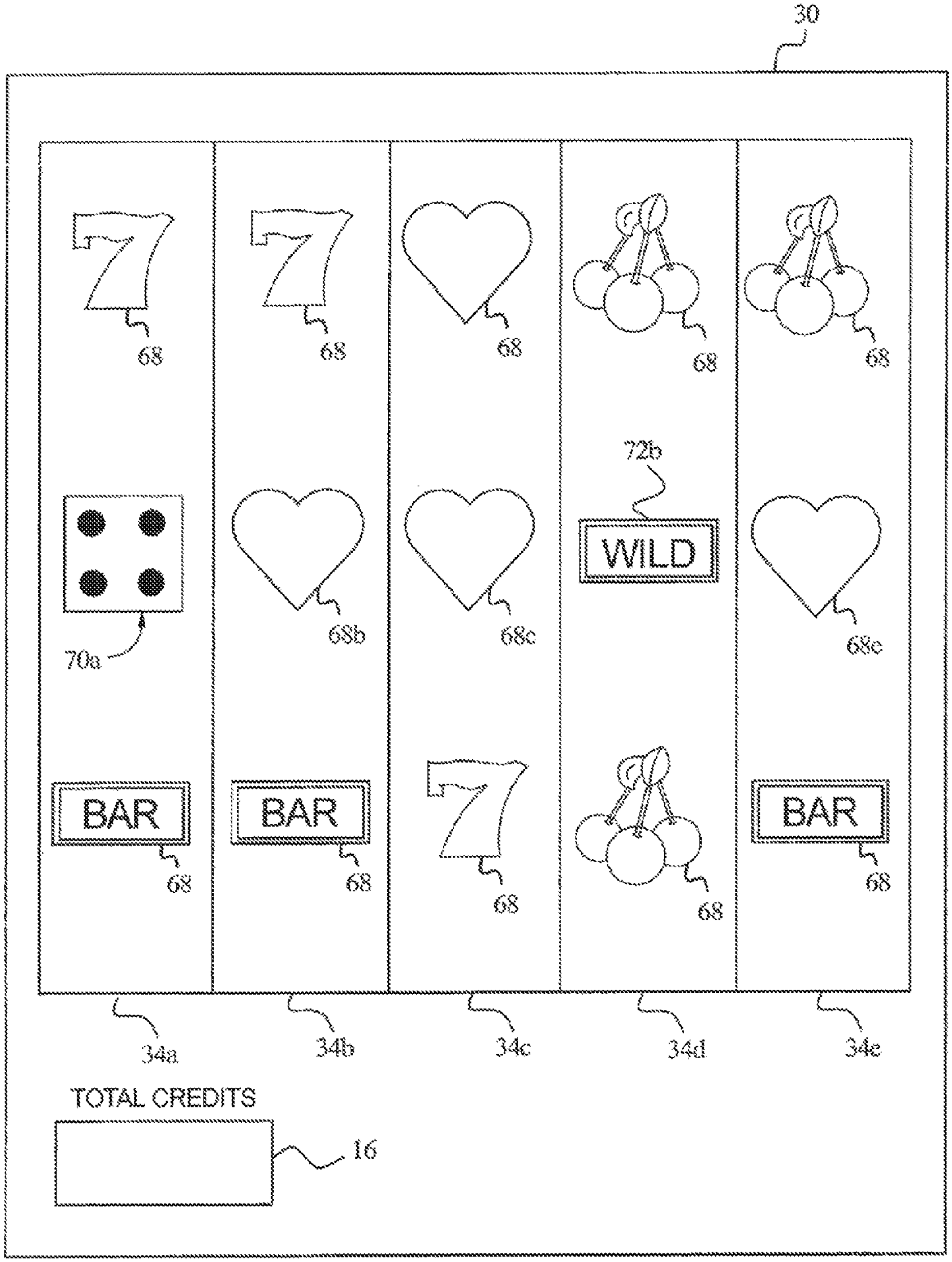

For example, a gaming device may have five reels and transformable wild symbols in the form of dice displayed within the display device on two of the reels, as illustrated in FIG. 6. The symbols along the payline 56 are, respectively, a transformable wild symbol **70*a*, a heart 68*b*, a heart 68*c*, a transformable wild symbol 70*b* and a heart 68*e*. If both transformable wild symbols 70*a* and 70*b* are simultaneously transformed into wild symbols, represented by symbols 75*a* and 75*b* and illustrated in FIG. 7, the user obtains an award associated with five hearts along the payline 56. If the transformable wild symbols 70*a* and 70*b* are transformed successively, the gaming device awards the player for each winning combination which results from the individual transformations. First, the gaming device awards the player for a three heart combination including the transformable wild symbol 75*a* in combination with the first heart symbol 68*b* and second heart symbol 68*c* as further illustrated in FIG. 8A. The gaming device then awards the player for a 4 heart combination; that is, for the first, second and third hearts 68*b*, 68*c* and 68*e* in combination with the transformable wild symbol 72*b*, as further illustrated in FIG. 8**B. It should thus be appreciated that the symbols can be transformed simultaneously, successively, or in any combination thereof. It should also be further appreciated that multiple transformable wild symbols could be on each reel and that the indicators of the transformable wild symbols may alternate in various combinations as contemplated by the present invention.

Figure 9:
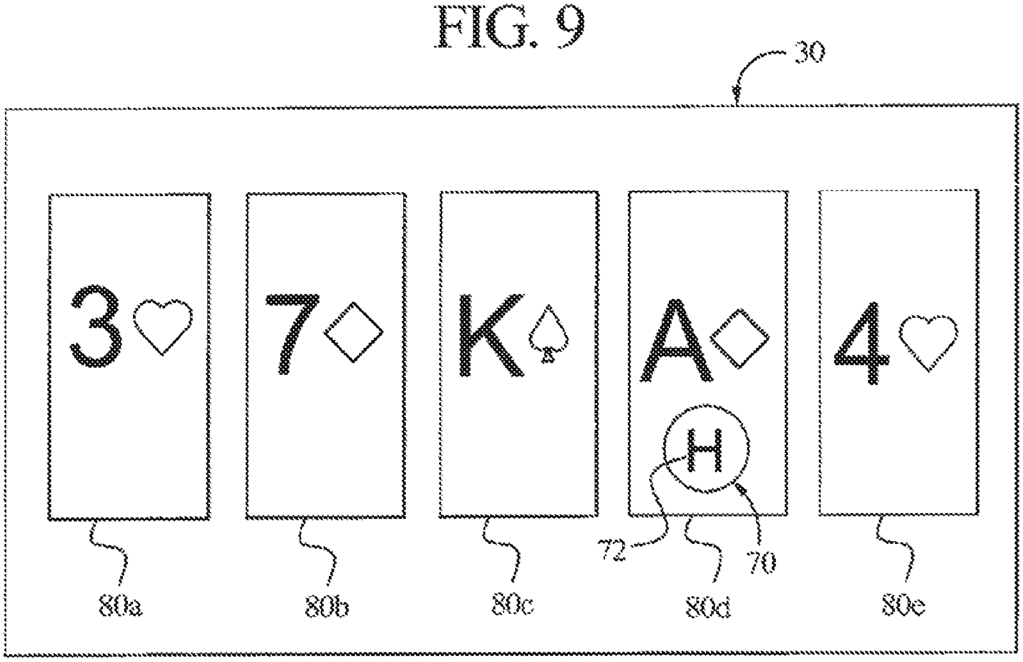
FIG. 9 is a front elevation view of a display device displaying a set of cards having a transformable wild symbol.
Figure 10:
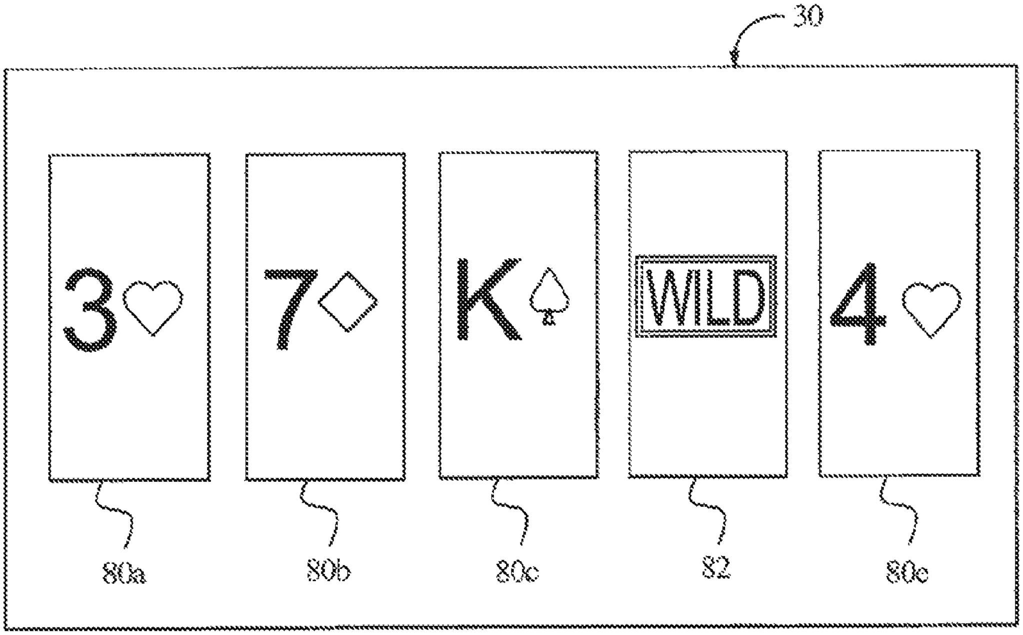
FIG. 10 is a front elevation view of a display device in which a card is transformed into a wild card.

It should also be appreciated that the transformable wild symbols could be employed in other base or in bonus games. For example, in one embodiment, the display device provides a video display for a gaming scheme involving cards **80*a* through 80*e*, as illustrated in FIG. 9. Each card is capable of being or displaying a transformable wild symbol 70. Card 80*d* includes a transformable wild symbol 70 in the form of a coin. The transformable wild symbol displays the wild indicator 72 in the form of an "H" for heads. Although not shown, the non-wild indicator in this embodiment would be a "T" for tails. The processor transforms the card 80*d* into a wild card 82, as illustrated in FIG. 10** when in the wild state. If the player obtains a whining combination as a result of the wild card, the gaming device awards the player accordingly. In one embodiment, the processor signals to the player that the card is a wild card by displaying the word "WILD." In another embodiment, the card flashes. Any other visual or audio means can also be implemented to distinguish the wild card from non-wild cards.

It should also be appreciated that more than one card can include a transformable wild symbol. In this embodiment, the processor transforms the cards into wild cards either simultaneously or successively.

Figure 11:
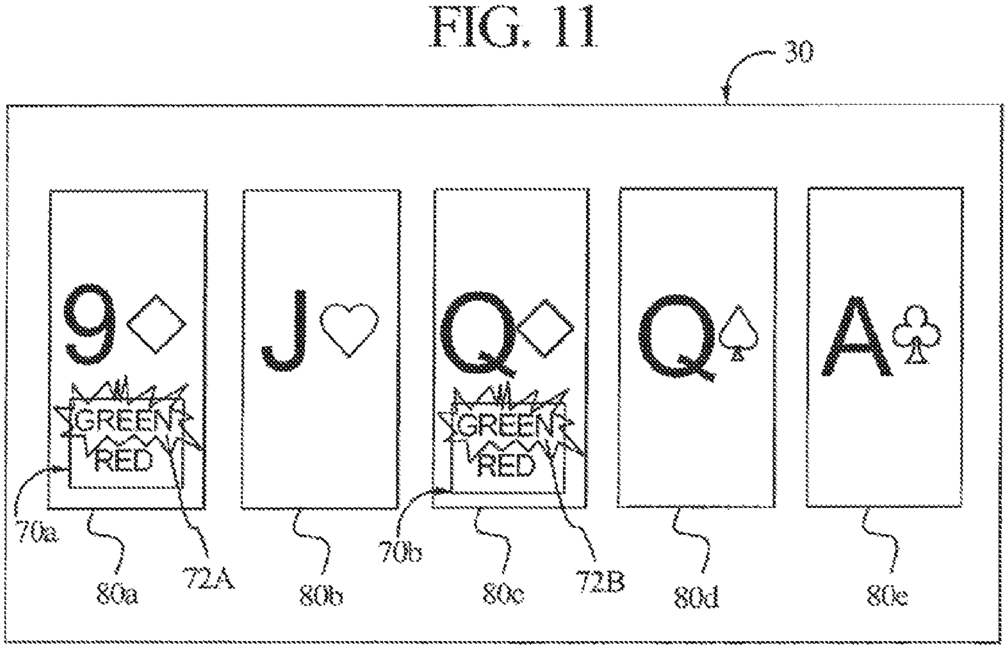
FIG. 11 is a front elevation view of a display device displaying a set of cards.
Figure 12:
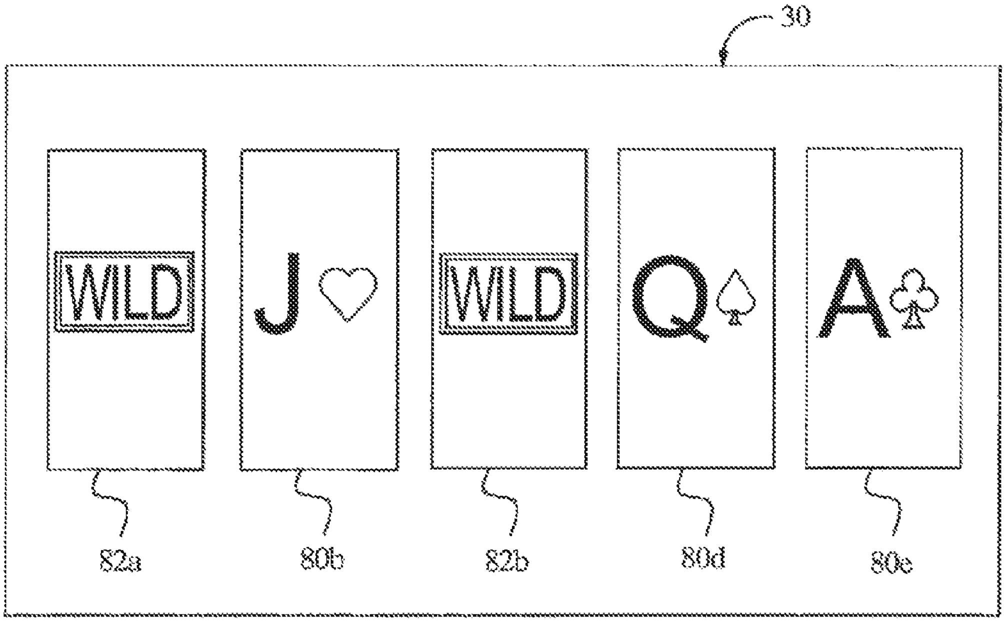
FIG. 12 is a front elevation view of a display device displaying a set of cards wherein certain cards are transformed into wild cards.

For example, a set of cards 80*a* through 80*e* are displayed in FIG. 11. The first card 80*a* and the third card 80*c* have transformable wild symbols 70*a* and 70*b*. If both transformable symbols are in a wild state and the processor transforms the first and third cards into wild cards 82*a* and 82*b* simultaneously and the player obtains a straight as illustrated in FIG. 12.

Figure 13A:
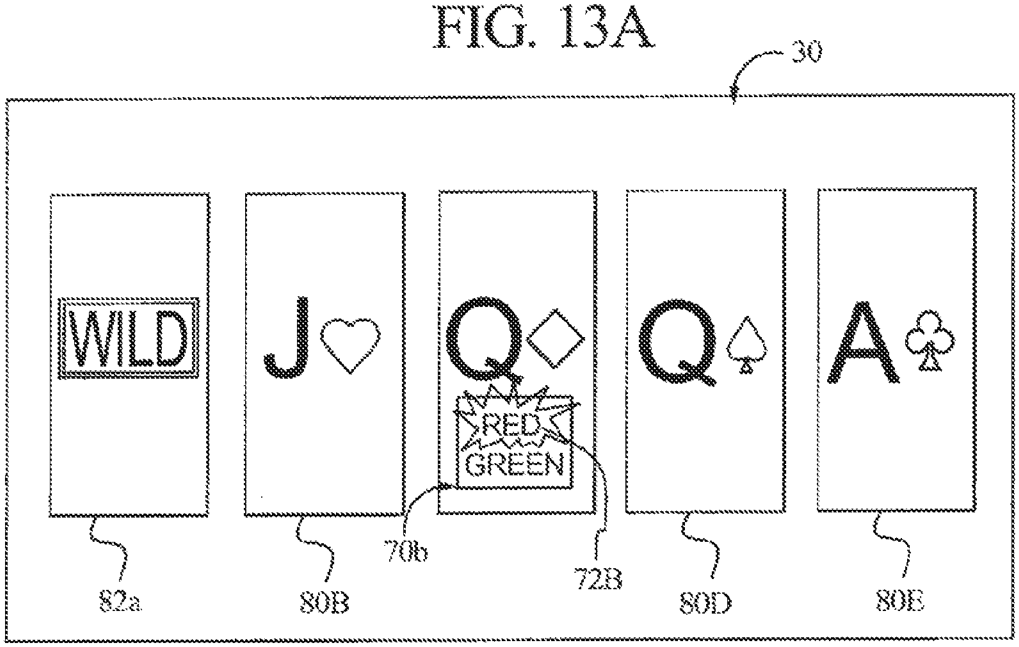
FIGS. 13A and 13B are front elevation views of a display device displaying a set of cards wherein certain cards are transformed into wild cards.
Figure 13B:
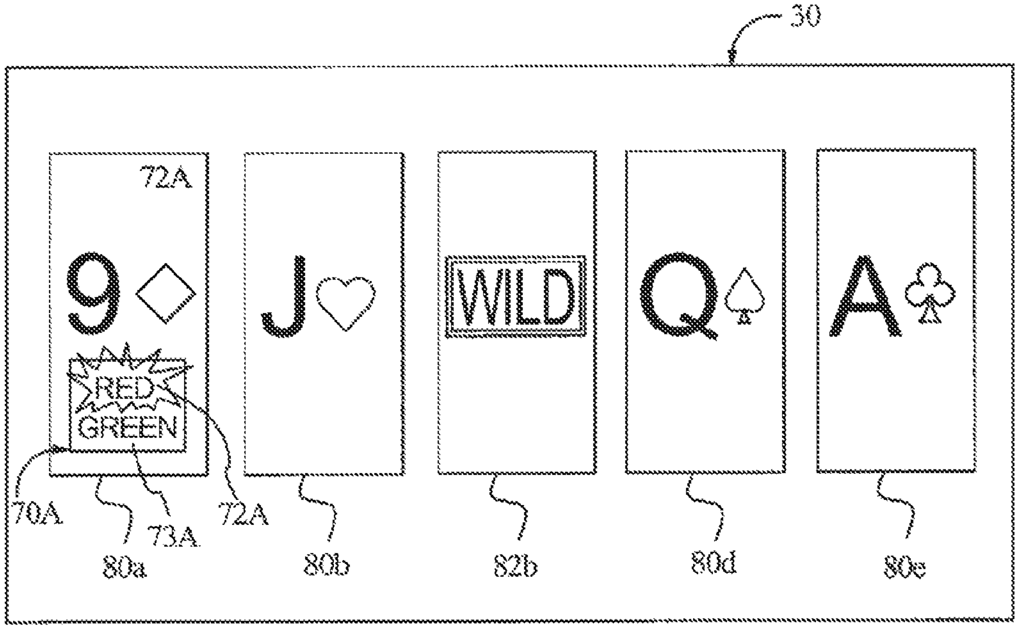

If the first and third cards 80*a* and 80*c* are transformed successively, the gaming device awards the player for any of the separate winning combinations. Card 80*a* becomes a wild card 82*a* and substitutes for a Queen as illustrated in FIG. 13A. The player then has 3 Queens. Next, card 80*c* becomes a wild card 82*b* and substitutes for an Ace, providing the player with a pair of Aces as illustrated in FIG. 13B. When the third card 80*c* transforms into a wild card, the first card 80*a* is not a wild card.

The present invention also contemplates the transformable wild symbol having additional indicators corresponding to additional states. For example, the transformable wild symbol could include a repeat indicator, wherein if the repeat indicator is obtained, the processor could re-determine whether the symbol is wild or not wild. In the traffic signal example, the repeat indicator could be a "YELLOW" light or section.

In another embodiment, the transformable wild symbol has a plurality of states which correspond to different types of payouts. In an example, the transformable wild symbol is in the form of a traffic signal having three lights or sections, i.e., "RED", "YELLOW" and "GREEN." The "RED" section is a non-wild indicator. The "GREEN" section is a wild indicator. The "YELLOW" section is a limited wild indicator which corresponds to a limited wild state. For example, if the "YELLOW" section is illuminated on the transformable wild symbol, the processor limits the type of payout based on a set of conditions. In one example, the transformable wild symbol substitutes for only a selected group of symbols implemented in the game such as only matching hearts in the reel embodiment. The processor may randomly choose the conditions or the conditions could be pre-determined. In a video poker embodiment, a transformable wild symbol in a limited wild state may for instance substitute for only half of the cards implemented by the gaming device, such as all diamonds and hearts. In other embodiments, the processor conditions the amounts paid for winning combinations resulting from transformation of the transformable wild symbol into a limited wild symbol.

In another embodiment, when the transformable wild symbol is in a limited wild state, the processor provides the player with an additional spin of the reels. For example, the player spins the reels. The transformable wild symbol is in the form of a die. The die has 6 faces displaying the numbers 1-6. Numbers 1 and 2 are non-wild indicators. Numbers 5 and 6 are wild indicators. Numbers 3 and 4 are limited wild indicators. The limited wild indicators correspond to an additional spin for a player. Similarly, in a video poker embodiment, a 3 or 4 displayed on a transformable wild symbol in the form of a die corresponds to a re-dealing of the cards. It should be appreciated that other conditions and other states are contemplated by the present invention.

In a further embodiment of the present invention, the transformable wild symbol(s) are not pre-associated, dedicated or predetermined. Rather, the processor randomly determines which, if any, of the symbols displayed to the player will be transformable wild symbols. Thus, any of the symbols on the reels could be transformable wild symbols and could be evaluated by the processor to determine if that symbol is in the wild state. Additionally, multiple symbols on the reels could be randomly selected by the processor to be transformable wild symbols.

In another embodiment of the present invention the transformable wild symbol(s) could roam on a display in a pattern or sequence or randomly, wherein the processor randomly determines if each symbol reached in the roaming or random determination transforms into a wild symbol. It should also be appreciated that since any symbol may be a transformable wild symbol, the wild indicator may or may not be part of the symbol.

A further embodiment of the present invention includes an activator symbol. In this embodiment, the processor does not determine if a transformable wild symbol will be wild until an activator symbol is also displayed to the player on the reels. When the activator symbol is displayed, the processor activates the transformable wild symbol which is illustrated by the symbol alternating from the wild indicator to the non-wild indicator (e.g., flashing from red to green) until one of the states is finally indicated. Each activator could activate one or more transformable wild symbols, and each transformable symbol may be activated by one or more activator symbols.

In a further embodiment, the present invention is employed in a bonus game and a plurality of or all of the symbols are transformable wild symbols. In this embodiment, the processor simultaneously or sequentially determines if each symbol which is a transformable wild symbol is in the wild state or the non-wild state and provides the appropriate awards based on the outcomes.

In a further embodiment of the present invention, the gaming device provides at least two player selectable selections associated with at least one transformable wild symbol. The processor randomly associates the non-wild state with one selection and the wild state with another selection. The player picks one of the selections and the state associated with the picked selection is the state of the wild symbol. The processor accordingly makes the appropriate transformation based on the player's selection.

It should be appreciated that the transformable wild symbols or cards of the present invention, when in the wild state, may transform into any of the other symbols or cards or into less than all of the other symbols or cards. For instance, the transformable wild symbol when in the wild state could transform into a limited number of symbols or cards such as a pre-defined, or randomly determined sub-set or group of the symbols or cards.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming system comprising:

at least one processor;

at least display device;

at least one input device; and at least one memory device storing a plurality of instructions which, when executed by the at least one processor, cause the at least one processor to operate with the at least one display device and the at least one input device to:

(a) display a plurality of a plurality of different symbols;

(b) randomly determine whether any of the displayed symbols are a transformable wild symbol;

(c) if at least one of the displayed symbols is the transformable wild symbol, for each displayed transformable wild symbol:

(i) randomly determine whether said displayed transformable wild symbol is in a wild state or a non-wild state;

(ii) if said displayed transformable wild symbol is in the wild state, display a wild indicator indicating that said displayed transformable wild symbol is in the wild state; and (iii) if said displayed transformable wild symbol is in the non-wild state, display a non-wild indicator indicating that said displayed transformable wild symbol is in the non-wild state; and (d) display any awards associated with the displayed symbols.

2. The gaming system of claim 1, wherein if at least one of the displayed symbols is the transformable wild symbol, for each displayed transformable wild symbol, said displayed transformable wild symbol is configured to function as any of the plurality of different symbols if said displayed transformable wild symbol is in the wild state.

3. The gaming system of claim 1, wherein the plurality of instructions, when executed by the at least one processor, cause the at least one processor, if at least one of the displayed symbols is the transformable wild symbol, for each displayed transformable wild symbol, to randomly determine whether said displayed transformable wild symbol is in the wild state or the non-wild state based on a predetermined probability.

4. A method of operating a gaming system, said method comprising:

(a) causing at least one processor to execute a plurality of instructions stored in at least one memory device to operate with at least one display device to display a plurality of a plurality of different symbols;

(b) causing the at least one processor to execute the plurality of instructions to randomly determine whether any of the displayed symbols are a transformable wild symbol;

(c) if at least one of the displayed symbols is the transformable wild symbol, for each displayed transformable wild symbol, causing the at least one processor to execute the plurality of instructions to:

(i) randomly determine whether said displayed transformable wild symbol is in a wild state or a non-wild state;

(ii) if said displayed transformable wild symbol is in the wild state, operate with the at least on display device to display a wild indicator indicating that said displayed transformable wild symbol is in the wild state; and (iii) if said displayed transformable wild symbol is in the non-wild state, operate with the at least one display device to display a non-wild indicator indicating that said displayed transformable wild symbol is in the non-wild state; and (d) causing the at least one processor to execute the plurality of instructions to operate with the at least one display device to display any awards associated with the displayed symbols.

5. The method of claim 4, wherein if at least one of the displayed symbols is the transformable wild symbol, for each displayed transformable wild symbol, said displayed transformable wild symbol is configured to function as any of the plurality of different symbols if said displayed transformable wild symbol is in the wild state.

6. The method of claim 4, which includes causing the at least one processor to execute the plurality of instructions, if at least one of the displayed symbols is the transformable wild symbol, for each displayed transformable wild symbol, to randomly determine whether said displayed transformable wild symbol is in the wild state or the non-wild state based on a predetermined probability.

7. The method of claim 4, which is provided through a data network.

8. The method of claim 7, wherein the data network is an internet.

9. A gaming system comprising:

at least one processor;

at least display device;

at least one input device; and at least one memory device storing a plurality of instructions which, when executed by the at least one processor, cause the at least one processor to operate with the at least one display device and the at least one input device to:

(a) display a plurality of a plurality of different symbols;

(b) for each of a subset of at least one of the displayed symbols:

(i) randomly determine whether said displayed symbol is a transformable wild symbol; and (ii) if said displayed symbol is the transformable wild symbol:

(A) randomly determine whether said displayed transformable wild symbol is in a wild state or a non-wild state;

(B) if said displayed transformable wild symbol is in the wild state, display an indication that said displayed transformable wild symbol is in the wild state; and (C) if said displayed transformable wild symbol is in the non-wild state, display an indication that said displayed transformable wild symbol is in the non-wild state; and (c) display any awards associated with the displayed symbols.

10. The gaming system of claim 9, wherein the plurality of instructions, when executed by the at least one processor, cause the at least one processor to determine which of the displayed symbols are included in the subset of the displayed symbols based on a pattern associated with the displayed symbols.

11. The gaming system of claim 10, wherein the pattern is one of: (a) randomly determined and (b) predetermined.

12. The gaming system of claim 9, wherein for each of the subset of the displayed symbols, if said displayed symbol is the transformable wild symbol, said displayed transformable wild symbol is configured to function as any of the plurality of different symbols if said displayed transformable wild symbol is in the wild state.

13. The gaming system of claim 9, wherein the plurality of instructions, when executed by the at least one processor, cause the at least one processor, for each of the subset of the displayed symbols, if said displayed symbol is the transformable wild symbol, to randomly determine whether said displayed transformable wild symbol is in the wild state or the non-wild state.

14. The gaming system of claim 9, wherein the plurality of instructions, when executed by the at least one processor, cause the at least one processor, for each of the subset of the displayed symbols, if said displayed symbol is the transformable wild symbol, to randomly determine whether said displayed transformable wild symbol is in the wild state or the non-wild state based on a predetermined probability.

15. A method of operating a gaming system, said method comprising:

(a) causing at least one processor to execute a plurality of instructions stored in at least one memory device to operate with at least one display device to display a plurality of a plurality of different symbols;

(b) for each of a subset of at least one of the displayed symbols, causing the at least one processor to execute the plurality of instructions to:

(i) randomly determine whether said displayed symbol is a transformable wild symbol; and (ii) if said displayed symbol is the transformable wild symbol:

(A) randomly determine whether said displayed transformable wild symbol is in a wild state or a non-wild state;

(B) if said displayed transformable wild symbol is in the wild state, operate with the at least on display device to display an indication that said displayed transformable wild symbol is in the wild state; and (C) if said displayed transformable wild symbol is in the non-wild state, operate with the at least on display device to display an indication that said displayed transformable wild symbol is in the non-wild state; and (c) causing the at least one processor to execute the plurality of instructions to operate with the at least on display device to display any awards associated with the displayed symbols.

16. The method of claim 15, which includes causing the at least one processor to execute the plurality of instructions to determine which of the displayed symbols are included in the subset of the displayed symbols based on a pattern associated with the displayed symbols.

17. The method of claim 16, wherein the pattern is one of: (a) randomly determined and (b) predetermined.

18. The method of claim 15, wherein for each of the subset of the displayed symbols, if said displayed symbol is the transformable wild symbol, said displayed transformable wild symbol is configured to function as any of the plurality of different symbols if said displayed transformable wild symbol is in the wild state.

19. The method of claim 15, which includes causing the at least one processor to execute the plurality of instructions, for each of the subset of the displayed symbols, if said displayed symbol is the transformable wild symbol, to randomly determine whether said displayed transformable wild symbol is in the wild state or the non-wild state.

20. The method of claim 15, which includes causing the at least one processor to execute the plurality of instructions, for each of the subset of the displayed symbols, if said displayed symbol is the transformable wild symbol, to randomly determine whether said displayed transformable wild symbol is in the wild state or the non-wild state based on a predetermined probability.

21. The method of claim 15, which is provided through a data network.

22. The method of claim 21, wherein the data network is an internet.

* * * * *

UNITED STATES PATENT AND TRADEMARK OFFICE

CERTIFICATE OF CORRECTION

PATENT NO. : 8,747,214 B2
APPLICATION NO. : 13/745500
DATED : June 10, 2014
INVENTOR(S) : Joseph E. Kaminkow It is certified that error appears in the above-identified patent and that said Letters Patent is hereby corrected as shown below:

IN THE CLAIMS

In Claim 1, Column 10, Line 60, between “least” and “display” insert --one--.
In Claim 4, Column 11, Line 49, replace “on” with --one--.
In Claim 9, Column 12, Line 14, between “least” and “display” insert --one--.
In Claim 12, Column 12, Line 51, between “of” and “the” insert --at least one of--.
In Claim 13, Column 12, Line 58, between the second instance of “of” and the third instance of “the” insert --at least one of--.
In Claim 14, Column 12, Line 65, between the second instance of “of” and the third instance of “the” insert --at least one of--.
In Claim 15, Column 13, Line 20, replace “on” with --one--.
In Claim 15, Column 13, Line 24, replace “on” with --one--.
In Claim 15, Column 13, Line 29, replace “on” with --one--.
In Claim 16, Column 14, Line 4, between “of” and “the” insert --at least one of--.
In Claim 18, Column 14, Line 9, between “of” and “the” insert --at least one of--.
In Claim 19, Column 14, Line 16, between the second instance of “of” and the second instance of “the” insert --at least one of--.

Signed and Sealed this
Twenty-first Day of October, 2014

Michelle K. Lee

Michelle K. Lee
*Deputy Director of the United States Patent and Trademark Office*